(12) United States Patent
Leboucher (10) Patent No.: US 12,487,142 B2
(45) Date of Patent: Dec. 2, 2025

(54) APPARATUS AND METHOD FOR AUTOMATIC LEAK DETECTION

(71) Applicant: ATEQ, Les Clayes-sous-Bois (FR)

(72) Inventor: Davy Leboucher, Bloomfield Hills, MI (US)

(73) Assignee: ATEQ, Les Clayes-sous-Bois (FR)

( * ) Notice: Subject to any disclaimer, the term of this patent is extended or adjusted under 35 U.S.C. 154(b) by 560 days.

(21) Appl. No.: 17/719,626

(22) Filed: Apr. 13, 2022

(65) Prior Publication Data

US 2022/0326108 A1    Oct. 13, 2022

Related U.S. Application Data (60) Provisional application No. 63/174,256, filed on Apr. 13, 2021.

(51) Int. Cl.
*G01M 3/00* (2006.01)
(52) U.S. Cl.
CPC ............ *G01M 3/002* (2013.01); *G01M 3/007* (2013.01)
(58) Field of Classification Search
CPC .............................. G01M 3/002; G01M 3/007
See application file for complete search history.

(56) References Cited

U.S. PATENT DOCUMENTS

| | | | |
|---|---|---|---|
| 4,542,643 A | | 9/1985 | Himmelstein |
| 5,214,957 A | * | 6/1993 | Collins ............... G01M 3/3263 73/40 |
| 5,847,264 A | | 12/1998 | Martin et al. |
| 6,662,634 B2 | | 12/2003 | Lehmann |
| 7,899,629 B2 | * | 3/2011 | Behrends ............. G01M 3/007 137/561 R |

FOREIGN PATENT DOCUMENTS

| | | | |
|---|---|---|---|
| CN | 210136044 U | | 3/2020 |
| CN | 111761907 A | * | 10/2020 |

(Continued)

OTHER PUBLICATIONS

"Chemical vapor deposition", Wikipedia, Mar. 15, 2021, https://en.wikipedia.org/w/index.php?title=Chemical_vapor_deposition&oldid=1012178412#References (Year: 2021).*

*Primary Examiner* — Alexander A Mercado
*Assistant Examiner* — Julia Fitzpatrick
(74) *Attorney, Agent, or Firm* — Dierker & Kavanaugh, P.C.

(57) ABSTRACT

An apparatus for automatic leak detection, including a chamber to enclose a test specimen. A vacuum pump is in selectable fluid communication via an adiabatic noise cancellation valve with the chamber. A pressure transducer determines a pressure in the test specimen and transmits a pressure signal to a controller. The controller is to control the adiabatic noise cancellation valve to cause the vacuum pump to draw a vacuum from a space between the test specimen and the chamber thereby creating an adiabatic noise cancelling condition in which a temperature of the test specimen is stabilized. The controller is to control a flow of a test gas into the test specimen, and to determine a pressure decay rate from the pressure signal. The controller is to determine if the test specimen meets a leak test specification based on the pressure decay rate under the adiabatic noise cancelling condition.

13 Claims, 4 Drawing Sheets

(56) References Cited

FOREIGN PATENT DOCUMENTS

| | | | | |
|---|---|---|---|---|
| CN | 113008279 A | * | 6/2021 | |
| DE | 102017108947 A1 | * | 10/2018 | |
| EP | 3421963 B1 | * | 4/2021 | .......... G01M 3/3263 |
| JP | 2021011018 A | * | 2/2021 | |
| WO | WO-2015073861 A1 | * | 5/2015 | ............ G01M 3/002 |

* cited by examiner

FIG. 4

APPARATUS AND METHOD FOR AUTOMATIC LEAK DETECTION

CROSS-REFERENCE TO RELATED APPLICATION

This application claims the benefit of U.S. Provisional Application Ser. No. 63/174,256, filed Apr. 13, 2021, which is incorporated by reference herein in its entirety.

TECHNICAL FIELD

The present disclosure relates generally to an apparatus and method for automatic leak detection.

BACKGROUND

During the manufacturing process of some devices, the devices are subjected to leak testing to identify defects. Leak testing may be done at any stage in the manufacturing of a part. If a leak or related defect can be identified early in a manufacturing process, value-added processes may be stopped on parts that are destined for rejection. In some cases, leakage at some particular rate may be identified as a defect. Parts may be required to be water tight, vapor tight, oil tight, or have some specification for maximum allowable leak.

There are existing methods for leak detection. For example, bubble testing can be used to detect leaks up to about $10^{-3}$ millibar*liter per second (mbar l/s). In an example, bubble testing may be used to identify and locate a leak in a tire. The inflated tire is dunked into a tub of water and a stream of air bubbles will flow from a leak. Characteristics of helium atoms are applied in some existing test methods to detect leaks through small defects that produce leaks less than $10^{-6}$ mbar l/s.

However, testing at production line rates can be difficult. It can be challenging to test with desired specificity at feasible costs under the entire range of conditions that may exist in a production environment.

SUMMARY

An aspect provided herein includes an apparatus for automatic leak detection, comprising: a chamber to enclose a test specimen, the test specimen having a pressurizable volume that is pressurizable when leaks are smaller than a predetermined threshold; a vacuum pump in selectable fluid communication with the chamber; an adiabatic noise cancellation valve to selectably open and close the selectable fluid communication between the vacuum pump and the chamber; a pressure transducer connected to the test specimen for determining a pressure in the test specimen and for transmitting a signal indicative of the pressure in the test specimen to a controller; and the controller to control the adiabatic noise cancellation valve to cause the vacuum pump to draw a vacuum from a space between the test specimen and the chamber thereby creating an adiabatic noise cancelling condition in which a temperature of the test specimen is stabilized, the controller to control a flow of a test gas into the test specimen to reach a predetermined test pressure; the controller to determine a pressure decay rate from the signal indicative of the pressure in the test specimen; the controller to determine if the test specimen meets a leak test specification based on the pressure decay rate under the adiabatic noise cancelling condition.

In examples, the test gas is air. In examples, the apparatus for automatic leak detection further comprises an infrared reflective barrier disposed between the test specimen and at least a portion of the chamber to reduce infrared radiation heat transfer between the test specimen and the chamber. In examples, the infrared reflective barrier includes a polyamide layer having a natural polyamide color. In examples, the infrared reflective barrier is to enclose at least a portion of the test specimen and blocks at least 90 percent of the infrared energy exchanged between the test specimen and the chamber in an absence of the infrared reflective barrier. In examples, the infrared reflective barrier is non-outgassing to an extent that outgassing from the infrared reflective barrier does not induce or enhance a transfer of heat energy to or from the test specimen during a test cycle. In examples, the infrared reflective barrier includes a reflective surface disposed on a plastic substrate to reflect infrared radiation, wherein the reflective surface includes a layer of aluminum foil. In examples, the layer of aluminum foil is attached to the plastic substrate by an adhesive. In examples, the layer of aluminum foil is deposited on the plastic substrate by vapor deposition.

In examples, the apparatus for automatic leak detection further comprises a thermal insulating pad to support the test specimen in a test position and to reduce conduction heat transfer between the test specimen and the chamber. In examples, the thermal insulating pad is a thermal insulator to an extent that conduction heat transfer through the thermal insulating pad does not enhance a thermal exchange between the test specimen and the chamber during a test cycle. In examples, the thermal insulating pad is non-outgassing to an extent that outgassing from the thermal insulating pad does not induce or enhance a transfer of heat energy to or from the test specimen during a test cycle.

An aspect provided herein includes a method of automatic leak detection, comprising: cycling an adiabatic noise cancellation valve to activate adiabatic noise cancelling conditions; checking for a stable temperature in a test specimen by using a differential pressure sensor connected to an internal volume of the test specimen; monitoring of a vacuum level in a vacuum chamber surrounding the test specimen to determine if adiabatic noise cancelling conditions are achieved; starting a differential pressure decay instrument; determining a leak test result; dumping pressure from the test specimen; and dumping vacuum from the vacuum chamber.

In examples, the method of automatic leak detection further comprises blocking an infrared heat exchange path between the test specimen and a surface of the vacuum chamber via an infrared reflective barrier disposed between the test specimen and at least a portion of the vacuum chamber. In examples, the infrared reflective barrier includes a polyamide layer having a natural polyamide color. In examples, the method of automatic leak detection further comprises supporting the test specimen in a test position with a test fixture that includes a thermal insulating pad that provides thermal insulation to an extent that conduction heat transfer through the thermal insulating pad is to induce less than 1 percent error into the leak test result. In examples, the method of automatic leak detection further comprises reducing infrared radiation heat transfer between the test specimen and the vacuum chamber by disposing an infrared reflective barrier between the test specimen and at least a portion of the vacuum chamber wherein infrared radiation heat transfer between the test specimen and the vacuum chamber is to induce less than 1 percent error into the leak test result. In examples, a total outgassing from objects within a space bounded by an interior surface of the vacuum chamber is less than an effective amount for inducing or enhancing a transfer of heat energy to or from the test specimen during a test cycle.

It is to be understood that any combination of features from an apparatus disclosed herein and/or from the methods disclosed herein may be used together, and/or that any features from any or all of these aspects may be combined with any of the features of the examples disclosed herein to achieve the benefits as described in this disclosure.

BRIEF DESCRIPTION OF THE DRAWINGS

Features of examples of the present disclosure will become apparent by reference to the following detailed description and drawings, in which like reference numerals correspond to the same or similar, though perhaps not identical, components. For the sake of brevity, reference numerals or features having a previously described function may or may not be described in connection with other drawings in which they appear.

DETAILED DESCRIPTION

Sensitivity to a temperature or changes in temperature of test specimens is a challenge for many leak testing methods including pressure decay, differential pressure decay, thermal mass flow or any method that measure flow variation or pressure variation.

Some differential pressure decay leak test systems include a reference part that reduces temperature fluctuation. However it becomes very complicated when the pressure decay is below 1 or 2 Pa/s and the material of the test specimen is exchanging temperature in less than 1 second.

Some leak test systems could use of the "Central Zero" methods, but Central Zero methods may be difficult to implement in certain production processes.

Since Pressure is dependent on Volume and Temperature, any small variation will affect the result of leak tests.

| Ideal Gas Law: $P_T V = nRT$ |
|---|
| P = pressure |
| V = volume |
| n = amount of substance |
| R = ideal gas constant |
| T = temperature |

As disclosed herein, an Adiabatic Noise Cancellation/Cancelling (ANC™) test system and method is to test a test specimen with direct leak testing under an environment that cancels the effect of temperature. Direct leak testing means that pressure or flow inside the test specimen is observed. Indirect leak testing means that the pressure or flow in a chamber surrounding the test specimen is observed.

Examples of the present disclosure may be to inhibit the temperature exchange ratio of the test specimen before testing the test specimen in pressure decay.

In examples of the present disclosure, the pressure transducer may be any suitable pressure transducer including, e.g., a differential pressure sensor, a piezoelectric pressure sensor, or any other pressure sensor. In examples, leak detection may be done with flow sensors, including mass flow sensors.

Examples of test specimens that can be tested according to the methods and systems of the present disclosure include, but are not limited to: Radiators, cooling tubes, and aluminum parts after welding.

| ANC ™ test system/method is convenient for the following conditions: |
|---|
| Test pressure => from 0.5 PSI to 400 Psi |
| Pressure decay => 0.1 Pa/s to 20 Pa/s |
| Volume => 100 cm3 to 40 liters |
| Corresponds to leak rate from 0.2 to 40 cc/min depending on Volume |
| Part should be able to withstand Vacuum under −14 Psi without permanent damage |

Leak rate below these conditions may use other leak test method such as tracer gas.

Leak rate above these conditions might use standard differential pressure decay technology at ambient condition.

| EXAMPLE LEAK TEST SEQUENCE |
|---|
| STEP 1: (ANC ™) VALVE CYCLE TO ACTIVATE ADIABATIC NOISE CANCELLING CONDITIONS |
| STEP 2: CHECK FOR STABLE TEMPERATURE IN TEST SPECIMEN BY USING DIFFERENTIAL PRESSURE SENSOR CONNECTED TO INTERNAL VOLUME OF TEST SPECIMEN. |
| STEP 3: MONITORING OF VACUUM TO REACH ADIABATIC NOISE CANCELLING CONDITIONS |
| STEP 4: START OF THE DIFFERENTIAL PRESSURE DECAY INSTRUMENT |
| STEP 5 : LEAKTEST RESULT |
| STEP 6: TEST SPECIMEN PRESSURE DUMPING |
| STEP 7: VACUUM CHAMBER DUMPING |

Examples of the present disclosure may be applied as an improvement to existing machines that use a Helium mass spectrometer. The ANC™ test method disclosed herein could be applied to a modified Helium leak test machine. The modified machine could keep the existing vacuum pump. The modified machine could use shop air instead of Helium to realize cost savings. The modified machine could use a differential pressure decay or mass flow instrument. The existing machine could be converted to the apparatus of the present disclosure at least in part by plumbing the modified apparatus according to the ANC™ method disclosed herein.

Figure 1:
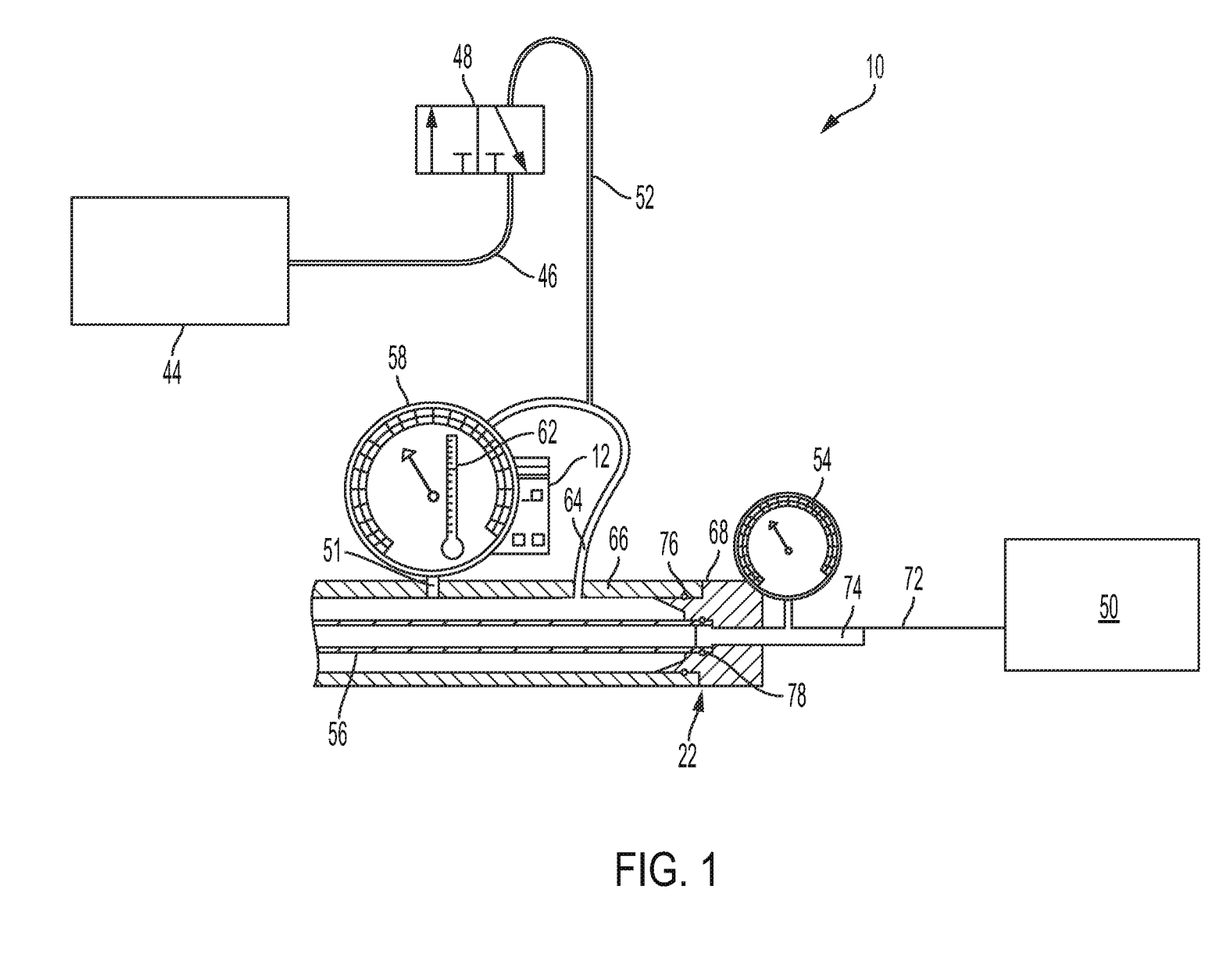
FIG. 1 is a semi-schematic diagram of an apparatus for automatic leak detection according to the present disclosure.

FIG. 1 is a semi-schematic diagram of an apparatus 10 for automatic leak detection according to the present disclosure. As depicted in FIG. 1, the apparatus 10 for automatic leak detection includes a chamber 22 to enclose a test specimen 56. The test specimen 56 has a pressurizable volume that is pressurizable when leaks are smaller than a predetermined threshold. A vacuum pump 44 may be in selectable fluid communication with the chamber 22 via vacuum tubes 46 and 52. An adiabatic noise cancellation valve 48 may be connected to vacuum tubes 46 and 52 as shown in FIG. 1 to selectably open and close the selectable fluid communication between the vacuum pump 44 and the chamber 22.

O-ring seal 76 may be included as shown in FIG. 1 to prevent leaks between end cap 68 and chamber tube wall 66. O-ring seal 78 may be included as shown in FIG. 1 to prevent leaks between end cap 68 and test specimen 56.

In the example depicted in FIG. 1, the pressure transducer 58 is connected to the chamber 22 via pressure connector 64. Pressure sensor 54 may monitor the pressure in the port 74. The pressure sensor 54 is to determine a pressure in the test specimen 56 and to transmit a signal indicative of the pressure in the test specimen 56 to a controller 12. Temperature display 62 displays the temperature in the chamber 22 detected by temperature probe 51. The controller 12 is to control the adiabatic noise cancellation valve 48 to cause the vacuum pump 44 to draw a vacuum from a space between the test specimen 56 and the chamber 22 thereby creating an adiabatic noise cancelling condition in which the temperature of the test specimen 56 is stabilized. The controller 12 is to control a flow of a test gas into the test specimen 56 to reach a predetermined test pressure. The controller 12 is to determine a pressure decay rate from the signal indicative of the pressure in the test specimen 56. The controller 12 is to determine if the test specimen 56 meets a leak test specification based on the pressure decay rate under the adiabatic noise cancelling condition. In examples, the test gas may be air. An air pressure supply 50 is connected via a pressure tube 72 to the port 74 which is in fluid communication with the test specimen 56.

Figure 2:
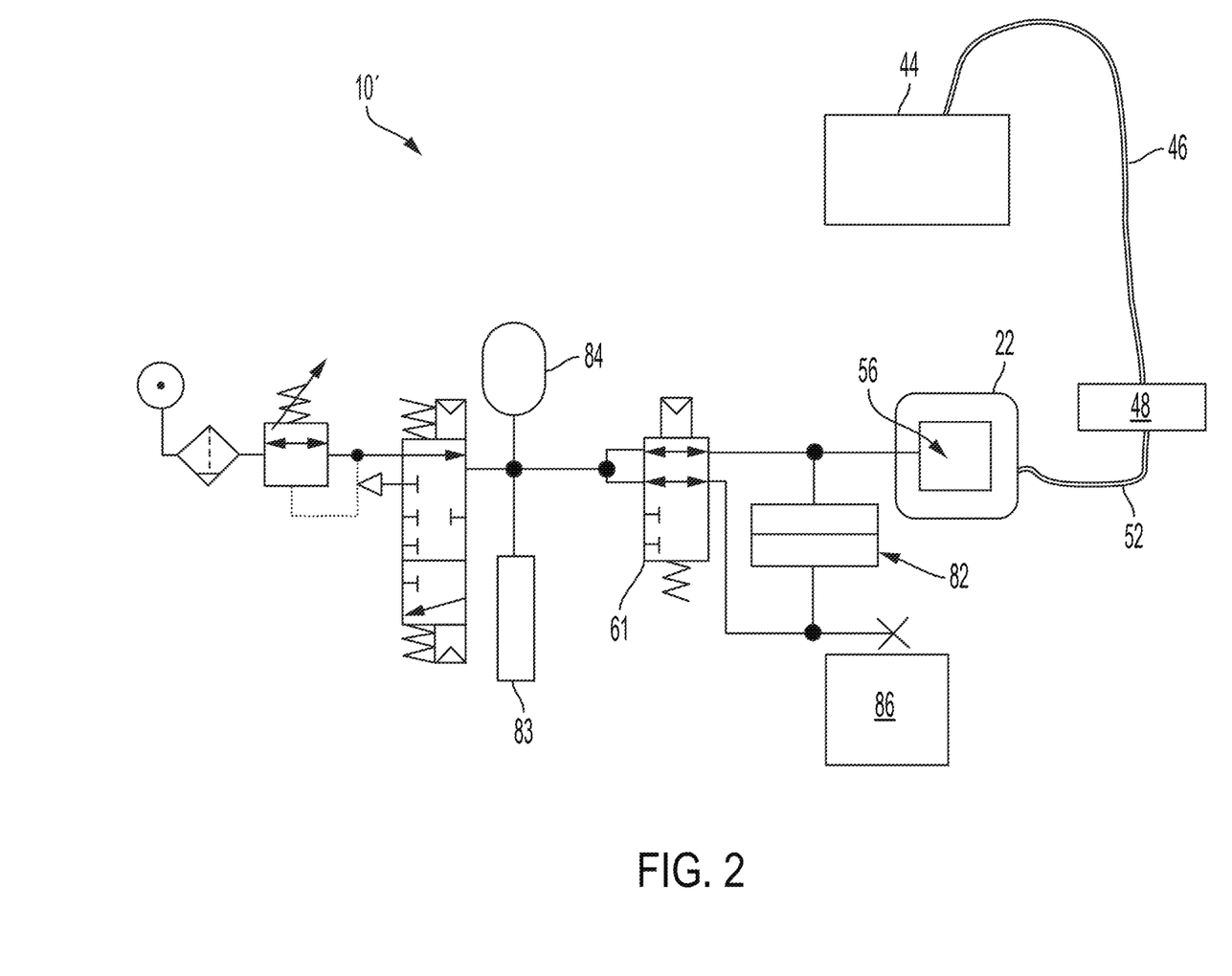
FIG. 2 is a semi-schematic diagram of another example of an apparatus for automatic leak detection according to the present disclosure.

FIG. 2 is a semi-schematic diagram of another example of an apparatus 10' for automatic leak detection according to the present disclosure. As depicted in FIG. 2, the apparatus 10' for automatic leak detection includes a chamber 22 to enclose a test specimen 56. The test specimen 56 has a pressurizable volume that is pressurizable when leaks are smaller than a predetermined threshold. A vacuum pump 44 may be in selectable fluid communication with the chamber 22 via vacuum tubes 46 and 52. An adiabatic noise cancellation valve 48 may be connected to vacuum tubes 46 and 52 as shown in FIG. 2 to selectably open and close the selectable fluid communication between the vacuum pump 44 and the chamber 22.

In the example depicted in FIG. 2, the differential pressure transducer 82 is to determine a difference between a pressure in the test specimen 56 and a reference volume 86. Internal volume 84 is selectably connected to the test specimen 56 and, optionally, the reference volume 86 via an electronic pressure switch 83 and an electronically controlled valve 61. The adiabatic noise cancellation valve 48 is to cause the vacuum pump 44 to draw a vacuum from a space between the test specimen 56 and the chamber 22 thereby creating an adiabatic noise cancelling condition in which the temperature of the test specimen 56 is stabilized.

Figure 3:
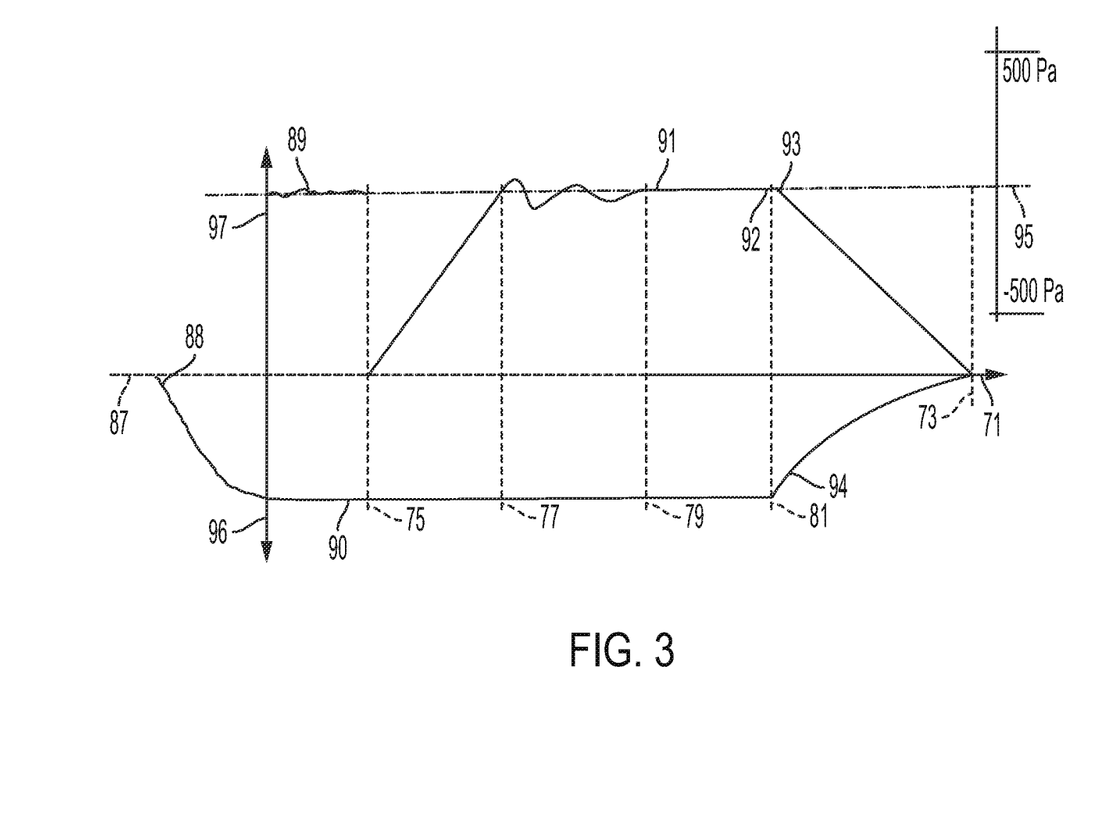
FIG. 3 is a timing diagram depicting a method for automatic leak detection with adiabatic noise cancelling conditions according to the present disclosure.

FIG. 3 is a timing diagram depicting a method for automatic leak detection with adiabatic noise cancelling conditions according to the present disclosure. A time axis 71 is collinear with a zero line 87 for a pressure sensor. The pressure sensor may be a piezoresistive pressure sensor, or use any suitable pressure sensor technology. Vacuum axis 96 indicates vacuum inside the chamber 22. Pressure axis 97 indicates pressure inside the test specimen 56. The test cycle begins with the chamber 22 door being closed and the ANC™ valve 48 being cycled to activate the adiabatic noise cancelling conditions. The chamber vacuum trace 88 indicates vacuum being drawn on the chamber 22. Optionally, after hard vacuum is achieved in the chamber 22 (as shown at 90 in FIG. 3), the test specimen 56 can be checked for temperature stability by checking the differential pressure between the test specimen 56 and a reference part. If the test specimen temperature is stable, the differential pressure will stabilize on the zero differential pressure line 95 as depicted by the trace at 89. If there is a large leak, the pressure in the test specimen 56 will be drawn down by the vacuum in the chamber and the trace 89 will fall below the zero differential pressure line 95. At fill start time 75, the test specimen 56 begins being pressurized. At stabilization start time 77, the test specimen 56 is fully pressurized and a valve is closed to maintain the mass inside the test specimen 56. The temperature/pressure stabilizes after stabilization start time 77. Stabilization ends and the test begins at Test Start Time 79. The differential pressure decay instrument is started at 91 and the leak test result is recorded at 92. At dump start time 81, vacuum enclosure dumping 94 and test specimen dumping 93 begin. The test cycle ends at Test Cycle End Time 73. The test specimen 56 is removed from the chamber 22 and a fresh test specimen 56 is loaded into the chamber 22. The chamber 22 door (not shown) is closed and a new test cycle begins with cycling the ANC™ valve 48 being cycled to activate the adiabatic noise cancelling conditions.

Figure 4:
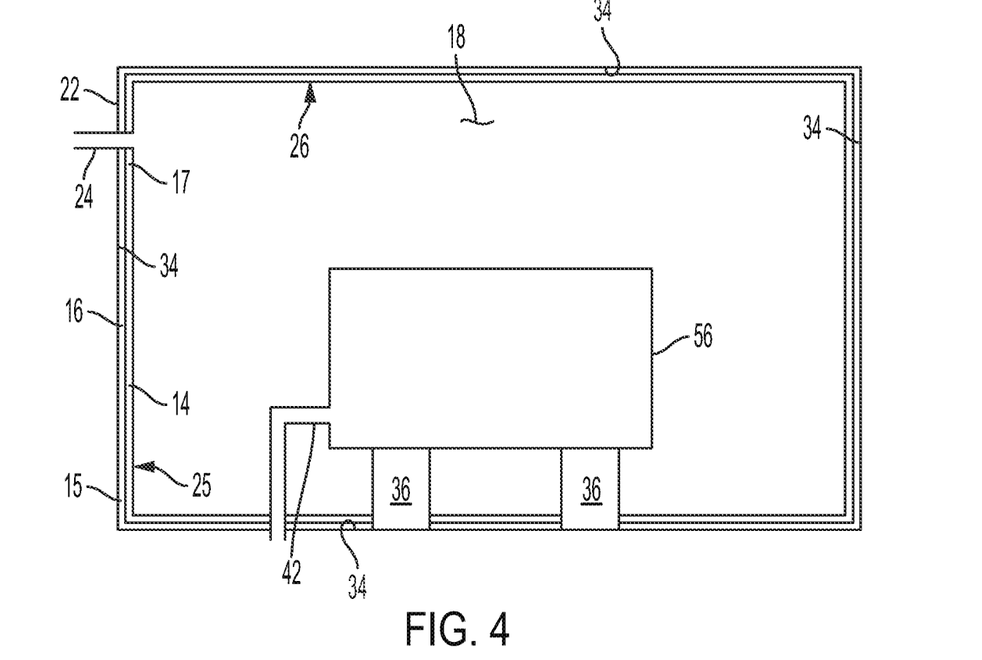
FIG. 4 is a semi-schematic diagram of an example of a test specimen in a vacuum chamber according to the present disclosure.

FIG. 4 is a semi-schematic diagram of an example of a test specimen 56 in a vacuum chamber 22 according to the present disclosure. An infrared reflective barrier 26 may be disposed between the test specimen 56 and at least a portion of the chamber 22 to reduce infrared radiation heat transfer between the test specimen 56 and the chamber 22. In the example depicted in FIG. 4, the infrared reflective barrier 26 covers all interior surfaces of the vacuum chamber 22. However, it is to be understood that portions of the vacuum chamber walls 34 may be without an infrared reflective barrier. For example, the infrared reflective barrier 26 may be installed over portions of the vacuum chamber walls 34 that are determined to be hot spots before the infrared reflective barrier 26 is installed. In examples, the infrared reflective barrier 26 may include a polyamide layer 14 having a natural polyamide color. In examples, the infrared reflective barrier 26 encloses at least a portion of the test specimen 56 and blocks at least 90 percent of the infrared energy exchanged between the test specimen 56 and the chamber 22 in an absence of the infrared reflective barrier 26. As depicted in FIG. 4, the infrared reflective barrier 26 may be disposed in contact with the vacuum chamber walls 34 to define a liner 25 for the vacuum chamber 22. A fluid connector 24 is disposed to provide fluid communication between the vacuum pump 44 and the chamber interior 18. A pressure conduit 42 is disposed to provide fluid communication between the air pressure supply 50 and the test specimen 56. The pressure conduit 42 may be to penetrate the vacuum chamber wall 34 and/or the infrared reflective barrier 26. Seals (not shown) may be installed to prevent gas leaks at penetration points on the vacuum chamber wall 34.

In examples, the infrared reflective barrier 26 may be non-outgassing to an extent that outgassing from the infrared reflective barrier 26 does not induce or enhance a transfer of heat energy to or from the test specimen 56 during a test cycle. In examples, the infrared reflective barrier 26 includes a reflective surface 16 disposed on a plastic substrate 17 to reflect infrared radiation. The reflective surface 16 may include a layer of aluminum foil 15. The layer of aluminum foil 15 may be attached to the plastic substrate 17 by an adhesive. The layer of aluminum foil 15 may be deposited on the plastic substrate 17 by vapor deposition or any suitable method of metal deposition on plastic.

As depicted in FIG. 4, a thermal insulating pad 36 is to support the test specimen 56 in a test position and to reduce conduction heat transfer between the test specimen 56 and the chamber 22. In examples, the thermal insulating pad 36 may be a thermal insulator to an extent that conduction heat transfer through the thermal insulating pad 36 does not enhance a thermal exchange between the test specimen 56 and the chamber 22 during a test cycle. In examples, the thermal insulating pad 36 is non-outgassing to an extent that outgassing from the thermal insulating pad 36 does not induce or enhance a transfer of heat energy to or from the test specimen 56 during a test cycle. In examples, the thermal insulating pad 36 may extend through the infrared reflective barrier 26. In examples, there may be a plurality of thermal insulating pads 36.

Tests confirm benefits of the "ANC™" method disclosed herein. Test Results Table below shows that the ANC™ method improved the standard deviation by seven times with a temperature difference of 10° C. to ambient. The tests reported in the Test Results Table below were conducted using a tabletop vacuum test chamber with transparent plastic walls having a volume of about 3 liters.

Test Results Table

| Temperature | Leak Description | Sequence Description | Mean Leak (cc/min) | Standard Deviation (cc/min) |
|---|---|---|---|---|
| Ambient | No Master Leak | Non-Vacuum (Sequence 1) | −0.0128 | 0.00952 |
|  |  | Vacuum (Sequence 7) | −0.0108 | 0.00992 |
| Ambient | Type A Master Leak | Non-Vacuum (Sequence 2) | 0.406 | 0.0194 |
| 10° C. + Ambient (Approx. 32° C.) | No Master Leak | Non-Vacuum (Sequence 5) | 0.736 | 0.129 |
|  |  | Vacuum (Sequence 11) | 0.228 | 0.0395 |
| 10° C. + Ambient (Approx. 32° C.) | Type A Master Leak | Non-Vacuum (Sequence 6) | 1.27 | 0.294 |
|  |  | Vacuum (Sequence 12) | 0.665 | 0.0577 |

Additional tests were performed using a repurposed vacuum chamber from a helium leak test apparatus originally for use with a helium mass spectrometer to detect leaks in automotive radiators as part of the radiator production line. Tests 1-17 reported below show that the ANC™ test method disclosed herein could be applied to a modified Helium leak test machine. In the tables below "TD" means Test Defect and "RD" means Reference Defect. "TD" and "RD" indicates a sign of the differential pressure across the differential pressure transducer 82.

In the tables below, "cm3/mn" stands for cubic centimeters per minute.

Test 1. Chamber open, 1 radiator in chamber, 1 ref. radiator in chamber

| | calculated leak | pressure |
|---|---|---|
| | 0.035 cm3/mn | 20.63 PSI |
| | 0.029 cm3/mn | 20.66 PSI |
| | 0.028 cm3/mn | 20.68 PSI |
| | 0.023 cm3/mn | 20.64 PSI |
| | 0.018 cm3/mn | 20.61 PSI |
| | −0.033 cm3/mn | 20.64 PSI |
| | −0.030 cm3/mn | 20.65 PSI |
| | −0.004 cm3/mn | 20.60 PSI |
| | −0.003 cm3/mn | 20.62 PSI |
| | −0.006 cm3/mn | 20.67 PSI |
| Average | 0.006 cm3/mn | |
| Max | 0.035 cm3/mn | |
| Min | −0.033 cm3/mn | |

Test 2. Chamber closed—no vacuum, 1 radiator in chamber, 1 ref. radiator in chamber

| | calculated leak | pressure |
|---|---|---|
| TD | 0.458 cm3/mn | 20.72 PSI |
| TD | 0.513 cm3/mn | 20.73 PSI |
| TD | 0.442 cm3/mn | 20.73 PSI |
| TD | 0.577 cm3/mn | 20.74 PSI |
| TD | 0.731 cm3/mn | 20.75 PSI |
| TD | 0.774 cm3/mn | 20.75 PSI |
| TD | 0.719 cm3/mn | 20.75 PSI |
| TD | 0.951 cm3/mn | 20.76 PSI |
| TD | 0.883 cm3/mn | 20.76 PSI |
| TD | 0.814 cm3/mn | 20.76 PSI |
| TD | 0.762 cm3/mn | 20.76 PSI |
| RD | cm3/mn | 20.77 PSI |
| TD | 0.403 cm3/mn | 20.58 PSI |
| TD | 0.620 cm3/mn | 20.58 PSI |
| | 0.688 cm3/mn | 20.58 PSI |
| Average | 0.667 cm3/mn | |
| Max | 0.951 cm3/mn | |
| Min | 0.403 cm3/mn | |

Test 3. Chamber closed—vacuum, 1 radiator in chamber, 1 ref. radiator in chamber, with leak

| | calculated leak | pressure |
|---|---|---|
| OK | 0.725 cm3/mn | 20.59 PSI |
| OK | 0.758 cm3/mn | 20.59 PSI |
| OK | 0.743 cm3/mn | 20.59 PSI |
| OK | 0.763 cm3/mn | 20.59 PSI |
| OK | 0.779 cm3/mn | 20.60 PSI |
| OK | 0.769 cm3/mn | 20.60 PSI |
| OK | 0.782 cm3/mn | 20.61 PSI |
| OK | 0.801 cm3/mn | 20.61 PSI |
| OK | 0.771 cm3/mn | 20.61 PSI |
| OK | 0.780 cm3/mn | 20.62 PSI |
| OK | 0.761 cm3/mn | 20.62 PSI |
| OK | 0.763 cm3/mn | 20.62 PSI |
| OK | 0.774 cm3/mn | 20.63 PSI |
| OK | 0.784 cm3/mn | 20.63 PSI |
| OK | 0.774 cm3/mn | 20.63 PSI |
| Average | 0.768 cm3/mn | |
| Max | 0.801 cm3/mn | |
| Min | 0.725 cm3/mn | |

Test 4. Chamber closed—vacuum, 1 radiator in chamber, 1 ref. radiator in chamber, zero leak

| | calculated leak | pressure |
|---|---|---|
| OK | −0.037 cm3/mn | 20.71 PSI |
| OK | 0.011 cm3/mn | 20.72 PSI |
| OK | 0.023 cm3/mn | 20.73 PSI |
| OK | 0.012 cm3/mn | 20.74 PSI |
| OK | −0.003 cm3/mn | 20.74 PSI |
| OK | 0.062 cm3/mn | 20.75 PSI |
| Average | 0.011 cm3/mn | |
| Max | 0.062 cm3/mn | |
| Min | −0.037 cm3/mn | |

Test 5. Chamber closed—no vacuum, 1 radiator in chamber, 1 ref. radiator in chamber, zero leak

|         | calculated leak | pressure  |
| ------- | --------------- | --------- |
| OK      | 0.696 cm3/mn    | 21.13 PSI |
| OK      | 0.579 cm3/mn    | 21.13 PSI |
| OK      | 0.536 cm3/mn    | 21.14 PSI |
| OK      | 0.481 cm3/mn    | 21.14 PSI |
| OK      | 0.418 cm3/mn    | 21.14 PSI |
| OK      | 0.359 cm3/mn    | 21.14 PSI |
| OK      | 0.321 cm3/mn    | 21.14 PSI |
| OK      | 0.284 cm3/mn    | 21.14 PSI |
| Average | 0.459 cm3/mn    |           |
| Max     | 0.696 cm3/mn    |           |
| Min     | 0.284 cm3/mn    |           |

Test 6. Chamber open—no vacuum, 1 radiator in chamber, 1 ref. radiator outside of chamber, zero leak

|         | calculated leak | pressure  |
| ------- | --------------- | --------- |
| TD      | 0.261 cm3/mn    | 21.14 PSI |
| TD      | 0.227 cm3/mn    | 21.14 PSI |
| TD      | 0.264 cm3/mn    | 21.15 PSI |
| TD      | 0.330 cm3/mn    | 21.15 PSI |
| TD      | 0.446 cm3/mn    | 21.16 PSI |
| TD      | 0.322 cm3/mn    | 21.16 PSI |
| TD      | 0.417 cm3/mn    | 21.17 PSI |
| TD      | 0.295 cm3/mn    | 21.18 PSI |
| TD      | 0.263 cm3/mn    | 21.18 PSI |
|         | 0.188 cm3/mn    | 21.19 PSI |
| Average | 0.301 cm3/mn    |           |
| Max     | 0.446 cm3/mn    |           |
| Min     | 0.188 cm3/mn    |           |

Test 7. Chamber open—no vacuum, 1 radiator in chamber, 1 ref. radiator outside of chamber, 0.87 sccm (standard cubic centimeters per minute) leak

|         | calculated leak | pressure  |
| ------- | --------------- | --------- |
| OK      | 0.639 cm3/mn    | 21.19 PSI |
| OK      | 0.759 cm3/mn    | 21.19 PSI |
| OK      | 0.760 cm3/mn    | 21.19 PSI |
| OK      | 1.160 cm3/mn    | 21.19 PSI |
| OK      | 1.080 cm3/mn    | 21.19 PSI |
| OK      | 1.040 cm3/mn    | 21.19 PSI |
| OK      | 0.752 cm3/mn    | 21.19 PSI |
| OK      | 0.666 cm3/mn    | 21.19 PSI |
| OK      | 0.652 cm3/mn    | 21.20 PSI |
| OK      | 0.654 cm3/mn    | 21.20 PSI |
| OK      | 0.855 cm3/mn    | 21.20 PSI |
| OK      | 0.756 cm3/mn    | 21.20 PSI |
| OK      | 0.760 cm3/mn    | 21.20 PSI |
| OK      | 0.768 cm3/mn    | 21.20 PSI |
| OK      | 0.869 cm3/mn    | 21.20 PSI |
| Average | 0.811 cm3/mn    |           |
| Max     | 1.160 cm3/mn    |           |
| Min     | 0.639 cm3/mn    |           |

Test 8. Chamber closed—with vacuum, 1 hot radiator in chamber, 1 ref. radiator outside of chamber, no leak.
Results: Calculated leak: ~3 sccm probably due to heat bridge with chamber 110° F. initial temperature.

Test 9. Chamber closed—with vacuum, 1 hot radiator in chamber, 1 ref. radiator outside of chamber, no leak, conductive heat contact with chamber removed, radiator at 95 degrees, ambient 83 degrees.
Results: Calculated leak: ~5.9 sccm Test 10. Chamber closed—with vacuum, 1 hot radiator in chamber, 1 ref. radiator outside of chamber, no leak, conductive heat contact with chamber removed, 2 pieces of cardboard placed in chamber.
Results: Calculated leak: ~10 sccm Test 11. Chamber closed—with vacuum, 1 hot radiator in chamber, 1 ref. radiator outside of chamber, no leak, conductive heat contact with chamber removed, 2 plastic spacers placed in chamber, radiator at 88 degrees, ambient 83 degrees.

| LARGE LEAK TEST | | |
| ------- | --------------- | --------- |
|         | calculated leak | pressure  |
| TD      | cm3/mn          | 21.88 PSI |
| TD      | 0.340 cm3/mn    | 21.73 PSI |
| TD      | 0.197 cm3/mn    | 21.73 PSI |
| TD      | 0.101 cm3/mn    | 21.73 PSI |
| RD      | −0.014 cm3/mn   | 21.74 PSI |
| TD      | 0.108 cm3/mn    | 21.74 PSI |
| TD      | 0.262 cm3/mn    | 21.75 PSI |
| TD      | 0.018 cm3/mn    | 21.75 PSI |
| TD      | 0.236 cm3/mn    | 21.76 PSI |
| RD      | −0.052 cm3/mn   | 21.76 PSI |
| RD      | −0.156 cm3/mn   | 21.77 PSI |
| TD      | 0.073 cm3/mn    | 21.77 PSI |
| TD      | 0.019 cm3/mn    | 21.78 PSI |
| RD      | −0.032 cm3/mn   | 21.78 PSI |
| TD      | 0.024 cm3/mn    | 21.79 PSI |
| TD      | 0.092 cm3/mn    | 21.79 PSI |
| TD      | 0.120 cm3/mn    | 21.80 PSI |
| TD      | 0.066 cm3/mn    | 21.80 PSI |
| RD      | −0.011 cm3/mn   | 21.81 PSI |
| TD      | 0.030 cm3/mn    | 21.81 PSI |
| TD      | 0.064 cm3/mn    | 21.82 PSI |
| TD      | 0.125 cm3/mn    | 21.82 PSI |
| TD      | 0.006 cm3/mn    | 21.83 PSI |
| Average | 0.073 cm3/mn    |           |
| Max     | 0.340 cm3/mn    |           |
| Min     | −0.156 cm3/mn   |           |

Test 12. Chamber closed—with vacuum, 1 hot radiator in chamber, 1 ref. radiator outside of chamber, no leak, conductive heat contact with chamber removed, 2 plastic spacers placed in chamber, overnight after temperature stabilization. Results: Calculated leak: all readings~0 sccm,
Max 0.132 sccm, Min −0.090 sccm Sample of Results from About Midnight During Overnight Test

|    | calculated leak | pressure  |
| -- | --------------- | --------- |
| TD | −0.034 cm3/mn   | 22.29 PSI |
| TD | −0.026 cm3/mn   | 22.29 PSI |
| TD | −0.046 cm3/mn   | 22.29 PSI |
| RD | −0.011 cm3/mn   | 22.29 PSI |
| TD | 0.012 cm3/mn    | 22.29 PSI |
| TD | −0.002 cm3/mn   | 22.29 PSI |
| TD | −0.043 cm3/mn   | 22.29 PSI |
| TD | 0.020 cm3/mn    | 22.29 PSI |
| RD | −0.002 cm3/mn   | 22.29 PSI |
| RD | 0.020 cm3/mn    | 22.29 PSI |
| TD | 0.016 cm3/mn    | 22.29 PSI |
| RD | −0.047 cm3/mn   | 22.29 PSI |
| TD | 0.048 cm3/mn    | 22.29 PSI |
| TD | 0.007 cm3/mn    | 22.29 PSI |
| TD | −0.024 cm3/mn   | 22.29 PSI |
| TD | −0.110 cm3/mn   | 22.29 PSI |
| RD | −0.078 cm3/mn   | 22.29 PSI |
| TD | −0.031 cm3/mn   | 22.29 PSI |
| TD | −0.039 cm3/mn   | 21.29 PSI |
| TD | −0.046 cm3/mn   | 22.29 PSI |
| TD | −0.008 cm3/mn   | 22.29 PSI |

-continued

|         | calculated leak | pressure |
|---------|-----------------|----------|
| TD      | 0.039 cm3/mn    | 22.29 PSI |
| Average | −0.018 cm3/mn   |          |
| Max     | 0.048 cm3/mn    |          |
| Min     | −0.110 cm3/mn   |          |

Test 13. Chamber open—no vacuum, 1 hot radiator in chamber, 1 ref. radiator outside of chamber, no leak, conductive heat contact with chamber removed, 2 plastic spacers placed in chamber, dump time (production simulation), one minute inter-cycle time.

Results: Test technician notes: radiator appears to be cooling down, chamber is heated by booster pump located behind the chamber (pump 178° F.) chamber at 88° F. on one side, chamber at 74° F. (ambient) on other side. Leak test readings at radiator trend toward zero leak after time, however data not recorded due to disconnected USB cable. After cable reconnected, the following data was recorded:

|         | calculated leak | pressure |
|---------|-----------------|----------|
| TD      | 0.186 cm3/mn    | 19.37 PSI |
| TD      | 0.185 cm3/mn    | 19.63 PSI |
| TD      | 0.191 cm3/mn    | 19.44 PSI |
| TD      | 0.092 cm3/mn    | 19.57 PSI |
| RD      | −0.115 cm3/mn   | 19.48 PSI |
| TD      | 0.101 cm3/mn    | 19.23 PSI |
| TD      | 0.088 cm3/mn    | 19.56 PSI |
| TD      | −0.033 cm3/mn   | 19.39 PSI |
| TD      | 0.082 cm3/mn    | 19.59 PSI |
| RD      | −0.047 cm3/mn   | 19.37 PSI |
| TD      | 0.023 cm3/mn    | 19.52 PSI |
| Average | 0.057 cm3/mn    |          |
| Max     | 0.191 cm3/mn    |          |
| Min     | −0.330 cm3/mn   |          |

Test 14. Simulated production condition: Chamber closed—with vacuum, 1 radiator in chamber, 1 ref. radiator outside of chamber, no leak, conductive heat contact with chamber removed, 2 plastic spacers placed in chamber, dump time (production simulation), one minute inter-cycle time.

Results: Test technician notes:
  Radiator went to 84° F. after one test cycle at 76° F. ambient.
  Radiator at 88° F. after second test cycle with vacuum. Calculated leak 0.713 sccm.
  Attempting to find why radiator temperature increasing by varying 1 condition at a time:
    Testing without vacuum does not cause radiator to increase temperature.
    Testing with chamber closed without vacuum does not cause radiator to increase temperature.
    Only testing with vacuum causes radiator temperature to increase. Radiator at 95° F. after third test cycle. Calculated leak 1.24 sccm.

Test 15. Simulated production condition: Chamber closed—with vacuum, 1 radiator in chamber, 1 ref. radiator outside of chamber, no leak, conductive heat contact with chamber removed, 2 plastic spacers placed in chamber, dump time (production simulation), one minute inter-cycle time, Rilsan® plate added between radiator and chamber wall.

Results: Test technician notes:
  30 second wait after vacuum pump starts—results became negative instead of positive.
    After lunch break, Calculated leak −0.464 sccm on certified no leak radiator. Radiator temperature rose to 84° F. after 1 cycle.
    Radiator at 94° F. after fourth cycle, calculated leak 0.993 sccm.
    Radiator at 94° F. after fifth cycle, calculated leak 0.913 sccm.
  60 second wait after vacuum pump starts—results improved over 30 second wait:
    −0.006 sccm; +0.217 sccm; +0.400 sccm
  heating radiator to 98° F., environment at 76° F.:
    1.94 sccm radiator at about 98° F. after test
    1.16 sccm next test, radiator 94° F. after test
  at start of test: radiator to 84° F., chamber 75° F. (about ambient):
    1.02 sccm, radiator at 90° F. average after test
  same as previous test 5 minutes later:
    0.396 sccm Test 16. Hot radiator outside of chamber.
Results: Test technician notes:
  Part at 98° F. at start of test. Large leak (temporary reading 7.35 sccm)
  Part at 84° F. at start of test. Large leak (temporary reading 5.85 sccm)
  Part at 82° F. at start of test. Large leak (temporary reading 2.72 sccm)
  Part at 80° F. at start of test. 2.90 sccm
  Part at 78° F. at start of test. 0.921 sccm
  Part at 78° F. at start of test. −0.253 sccm Test 17. Hot radiator inside closed chamber, 5 minute wait, ambient 78° F., chamber 81° F.
Results: Test technician notes:
  Part at 95° F. at start of test. 5.56 sccm
  Part at 84° F. at start of test. 1.57 sccm
  Part at 84° F. at start of test. 0.899 sccm, part at 83° F. after test Analysis of Tests 1-17: Scaling the tests up to large, production equipment with air as a test medium, from small, laboratory equipment with helium as a test medium presented new and unforeseen obstacles to successful and repeatable testing at production rates. The overnight repeatability test (Test 12) shows that if temperature is stabilized (i.e. no heat transfer from/to test specimen, ANC™ conditions) repeatable, reliable leak testing can be achieved. The helium mass spectrometer chamber is at a different temperature than ambient, due to the pump proximity, which affects the air leak test. Fast pumping of vacuum and fast return to atmospheric pressure in the chamber changes the temperature of the radiator itself which affects the air test. Any porous material, (e.g., cardboard) in the chamber may increase the heat exchange with vacuum via out gassing when compared to a test at ambient outside the chamber. The addition of a Rilsan® polyamide plate between a hot spot on the chamber wall and the radiator contributed to improvement in leak test readings. Since hard vacuum substantially eliminates heat exchange between the radiator and the chamber that would be caused by air convection and air conduction in air at atmospheric pressure, the heat exchange between the radiator and the chamber that was detected in vacuum tests may be from infrared radiation/light.

Without being held bound to any theory, it is believed that the infrared radiation/light heat exchange between the test article (e.g., radiator) and the test chamber walls may be reduced by placing a white Rilsan® polyamide plastic plate between the test article and the test chamber wall(s). It is believed that the reduction in radiation heat exchange is, at least in part, due to the surface of the plastic plate rapidly reaching the temperature of the radiator. Since radiation heat transfer is related to a temperature difference between a hot body and a cold body, surfaces with equal temperature will not have radiation heat transfer. In a metal vacuum chamber that has a greater thermal mass than the test article (e.g., radiator), it is the test article (e.g., radiator) that changes temperature via heat exchange with the more thermally massive chamber. Thus, more time and test cycles may be required to reach substantial thermal equilibrium between the test article and the metal vacuum chamber walls.

In examples, a plastic enclosure may be disposed around the test article to reduce infrared heat exchange between the test article and the vacuum chamber walls. In an example, the plastic enclosure may be made from a plastic that substantially does not outgas. As used herein, "substantially does not outgas" means that a heat exchange between the test article and the plastic enclosure due to outgassing causes an absolute error of less than 10 percent in the calculated leak rate. In examples, a reflective surface is disposed on the plastic enclosure to reflect infrared radiation/light radiated by the test article (e.g., radiator). In examples, the reflective surface may be a layer of aluminum foil. In examples, the aluminum foil may be attached to the plastic enclosure. In examples, the aluminum foil may be attached to the plastic enclosure with glue that substantially does not outgas. In examples, an aluminum layer may be deposited on the plastic enclosure by vapor deposition. In examples, the volume of air that is to be decompressed and recompressed in the vacuum chamber may be reduced by disposing plastic filler blocks inside the vacuum chamber.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise. No language in the specification should be construed as indicating any unclaimed element as essential to the practice of the examples.

As used herein, the term "fluid" means a gas, liquid, or combinations thereof.

In describing and claiming the examples disclosed herein, the singular forms "a", "an", and "the" include plural referents unless the context clearly dictates otherwise.

The terms "connect/connected/connection", "attach/attached/attachment" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" or "attached to" the other component is somehow in communication with the other component (notwithstanding the presence of one or more additional components therebetween). Additionally, two components may be permanently, semi-permanently, or releasably engaged with and/or connected to one another.

It is to be further understood that "communication" is to be construed to include all forms of communication, including direct and indirect communication. Indirect communication may include communication between two components with additional component(s) located therebetween.

While several examples have been described in detail, it is to be understood that the disclosed examples may be modified. Therefore, the foregoing description is to be considered non-limiting.

What is claimed is:

1. An apparatus for automatic leak detection, comprising:
a chamber to enclose a test specimen, the test specimen having a pressurizable volume that is pressurizable when leaks are smaller than a predetermined threshold;
a vacuum pump in selectable fluid communication with the chamber;
an adiabatic noise cancellation valve to selectably open and close the selectable fluid communication between the vacuum pump and the chamber;
a differential pressure transducer connected to the test specimen and a reference volume for directly determining a pressure difference between a pressure in the test specimen and an other pressure in the reference volume, and for transmitting a signal indicative of the pressure difference to a controller, wherein:
the apparatus is configured to operate when the test specimen is at least 5 degrees Fahrenheit warmer than the reference volume; and
the reference volume is located:
outside of the chamber and the reference volume is at ambient temperature, or
within the chamber and the reference volume is at a chamber temperature; and
the controller to control the adiabatic noise cancellation valve to cause the vacuum pump to draw a vacuum from a space between the test specimen and the chamber thereby creating an adiabatic noise cancelling condition in which a temperature of the test specimen is stabilized, an electronic pressure switch and electronically controlled valve to control a flow of a test gas through parallel ports of the electronically controlled valve into the test specimen and into the reference volume to reach a predetermined test pressure; the controller to determine a pressure decay rate from the signal indicative of the pressure difference; the controller to determine if the test specimen meets a leak test specification based on the pressure decay rate under the adiabatic noise cancelling condition.

2. The apparatus of claim 1 wherein the test gas is air.

3. The apparatus of claim 1, further comprising an infrared reflective barrier disposed between the test specimen and at least a portion of the chamber to reduce infrared radiation heat transfer between the test specimen and the chamber.

4. The apparatus of claim 3 wherein the infrared reflective barrier includes a polyamide layer having a natural polyamide color.

5. The apparatus of claim 3 wherein the infrared reflective barrier is to enclose at least a portion of the test specimen and blocks at least 90 percent of infrared energy exchanged between the test specimen and the chamber in an absence of the infrared reflective barrier.

6. The apparatus of claim 3 wherein the infrared reflective barrier is non-outgassing to an extent that outgassing from the infrared reflective barrier does not induce or enhance a transfer of heat energy to or from the test specimen during a test cycle.

7. The apparatus of claim 3 wherein the infrared reflective barrier includes a reflective surface disposed on a plastic substrate to reflect infrared radiation, wherein the reflective surface includes a layer of aluminum foil, wherein the layer of aluminum foil is at least one of: attached to the plastic substrate by an adhesive, or deposited on the plastic substrate by vapor deposition.

8. The apparatus of claim 1, further comprising a thermal insulating pad to support the test specimen in a test position and to reduce conduction heat transfer between the test specimen and the chamber.

9. A method of automatic leak detection, comprising:
cycling an adiabatic noise cancellation valve to activate adiabatic noise cancelling conditions;
checking for a stable temperature in a test specimen by using a differential pressure sensor connected to an internal volume of the test specimen and a reference volume, wherein:
the test specimen is at least 5 degrees Fahrenheit warmer than the reference volume;
the reference volume is located:
outside of a vacuum chamber surrounding the test specimen and the reference volume is at ambient temperature, or
within the vacuum chamber and the reference volume is at a chamber temperature;
the differential pressure sensor is to determine a pressure difference between a pressure in the test specimen and an other pressure in the reference volume; and
wherein the differential pressure sensor is to transmit a signal indicative of the pressure difference;
monitoring of a vacuum level in the vacuum chamber to determine if the adiabatic noise cancelling conditions are achieved;
starting a differential pressure decay instrument to monitor the signal indicative of the pressure difference over time to determine a pressure decay rate in the test specimen;
determining a leak test result based on the pressure decay rate under the adiabatic noise cancelling conditions;
dumping pressure from the test specimen; and
dumping vacuum from the vacuum chamber.

10. The method of automatic leak detection of claim 9, further comprising blocking an infrared heat exchange path between the test specimen and a surface of the vacuum chamber via an infrared reflective barrier disposed between the test specimen and at least a portion of the vacuum chamber.

11. The method of automatic leak detection of claim 10 wherein the infrared reflective barrier includes a polyamide layer having a natural polyamide color.

12. The method of automatic leak detection of claim 9, further comprising supporting the test specimen in a test position with a test fixture that includes a thermal insulating pad that provides thermal insulation to an extent that conduction heat transfer through the thermal insulating pad is to induce less than 1 percent error into the leak test result.

13. The method of automatic leak detection of claim 9, further comprising reducing infrared radiation heat transfer between the test specimen and the vacuum chamber by disposing an infrared reflective barrier between the test specimen and at least a portion of the vacuum chamber, wherein infrared radiation heat transfer between the test specimen and the vacuum chamber is to induce less than 1 percent error into the leak test result.

\* \* \* \* \*